(12) United States Patent
Lyytikäinen et al.

(10) Patent No.: US 11,584,676 B2
(45) Date of Patent: Feb. 21, 2023

(54) METHOD FOR TEMPERING GLASS SHEETS

(71) Applicant: Glaston Finland Oy, Tampere (FI)

(72) Inventors: Pekka Lyytikäinen, Tampere (FI); Jukka Vehmas, Tampere (FI)

(73) Assignee: GLASTON FINLAND OY, Tampere (FI)

( * ) Notice: Subject to any disclaimer, the term of this patent is extended or adjusted under 35 U.S.C. 154(b) by 675 days.

(21) Appl. No.: 16/606,472

(22) PCT Filed: Jun. 13, 2018

(86) PCT No.: PCT/FI2018/050459
§ 371 (c)(1),
(2) Date: Oct. 18, 2019

(87) PCT Pub. No.: WO2019/002672
PCT Pub. Date: Jan. 3, 2019

(65) Prior Publication Data
US 2020/0131070 A1   Apr. 30, 2020

(30) Foreign Application Priority Data

Jun. 27, 2017 (FI) ...................................... 20175608
Jun. 5, 2018 (FI) ...................................... 20185513

(51) Int. Cl.
C03B 27/044 (2006.01)
C03B 27/012 (2006.01)
C03B 27/04 (2006.01)

(52) U.S. Cl.
CPC .......... *C03B 27/044* (2013.01); *C03B 27/012* (2013.01); *C03B 27/0404* (2013.01); *C03B 27/0413* (2013.01); *C03B 27/0417* (2013.01)

(58) Field of Classification Search
None
See application file for complete search history.

(56) References Cited

U.S. PATENT DOCUMENTS 3,342,573 A * 9/1967 Fredley ................. C03B 35/243
                                                 65/25.2
3,396,000 A * 8/1968 Carson .................. C03B 23/035
                                                 65/351
(Continued)

FOREIGN PATENT DOCUMENTS

EP         3109207 A1 * 12/2016 ............. C03B 29/08
FI        20155730 A     5/2016
(Continued)

OTHER PUBLICATIONS

GlastonCorporation, "Glaston Heat treatment", Youtube-video [online], Dec. 17, 2010, https:/www.youtube.com/watch?v=IXnKZYTYxEg.
(Continued)

*Primary Examiner* — Alison L Hindenlang
*Assistant Examiner* — Steven S Lee
(74) *Attorney, Agent, or Firm* — Robinson & Cole LLP

(57) ABSTRACT

A method for heat strengthening or tempering glass sheets of a glass load containing several glass sheets, in which the glass sheets are heated in a furnace to a tempering temperature and the glass load is transferred at a transfer speed (W) away from the furnace into a tempering unit, in which the actual quenching is conducted by blasting cooling air onto both surfaces of the glass sheets. By an initial blasting unit, located between the furnace and the quenching unit and divided into initial blasting zones in the direction transverse to the motion of the glass, is blasted compressed air onto the surface of the leading and trailing edges of a glass sheet, to the direction of which normal it is desired to straighten the end in order to decrease end-edge kink.

17 Claims, 6 Drawing Sheets

(56) References Cited

U.S. PATENT DOCUMENTS

| | | | | |
|---|---|---|---|---|
| 3,522,029 | A * | 7/1970 | Carson | C03B 27/0404 65/351 |
| 3,923,488 | A * | 12/1975 | Pytel | C03B 27/0417 65/114 |
| 4,046,543 | A * | 9/1977 | Shields | C03B 27/0413 65/25.2 |
| 4,249,928 | A * | 2/1981 | Carleton | C03B 29/12 65/25.2 |
| 4,261,723 | A * | 4/1981 | Hargrave | C03B 27/048 65/114 |
| 4,311,507 | A * | 1/1982 | Starr | C03B 27/048 65/351 |
| 4,400,194 | A * | 8/1983 | Starr | C03B 27/0404 65/351 |
| 5,078,774 | A * | 1/1992 | Vehmas | C03B 27/016 65/168 |
| 5,368,624 | A * | 11/1994 | Lehto | C03B 29/08 65/161 |
| 6,378,339 | B1 * | 4/2002 | Zalesak | C03B 35/161 65/273 |
| 6,410,887 | B1 | 6/2002 | Reunamaki | |
| 8,322,162 | B2 * | 12/2012 | Janhunen | C03B 29/08 219/400 |
| 2009/0199594 | A1 * | 8/2009 | Abbott | C03B 35/14 65/161 |
| 2016/0145143 | A1 * | 5/2016 | Kylväjä | C03B 27/0413 65/115 |

FOREIGN PATENT DOCUMENTS

| | | |
|---|---|---|
| GB | 1071555 A | 6/1967 |
| GB | 1194397 A | 6/1970 |
| NZ | 227947 A | 7/1991 |

OTHER PUBLICATIONS

International Preliminary Report on Patentability (PCT/IPEA/409) dated Apr. 2, 2019, by the Finnish Patent Office as the International Preliminary Examining Authority for International Application No. PCT/FI2018/050459.

International Search Report (PCT/ISA/210) and Written Opinion (PCT/ISA/237) dated Sep. 3, 2018, by the Finnish Patent Office as the International Searching Authority for International Application No. PCT/FI2018/050459.

Nassco Trading, "Landglass Cyclone Glass Tempering Line Full Convection / Tempering Furnace", Youtube-video [online], Feb. 20, 2016, https://www.youtube.com/watch?v=WzzpJoBXnKk.

Search Report dated Jan. 5, 2018, by the Finnish Patent Office for Application No. 20175608.

Search Report dated Nov. 30, 2018, by the Finnish Patent Office for Application No. 20185513.

* cited by examiner

METHOD FOR TEMPERING GLASS SHEETS

The invention relates to a method for tempering glass sheets, in which a glass sheet is heated to a tempering temperature and quenching is conducted by blasting cooling air as jets towards the glass sheet.

Tempering furnaces for glass sheets, wherein the glass sheets are moving on top of rotating ceramic rollers rotating in a single direction or back and forth, and from where the same proceed at a tempering temperature along a roller track to a quenching unit downstream of the furnace, in which the quenching is conducted with air jets, are generally known and in service. The roller track-provided furnace is called in the art, for example, a roller hearth furnace. A typical furnace temperature is about 700° C. and the temperature of air used for cooling is typically about the same as the air temperature outdoors or in a factory hall. Cooling air is supplied by a fan or a compressor. In furnaces and quenching units based on air support technology, the glass sheet is floating while being supported by a thin air bed and only comes to contact with conveyor track rollers or other transport elements along one of its side edges. The glass sheet tempering machines based on air support technology are clearly less common than roller track-provided tempering machines. The furnace based on air support technology is called in the art, for example, an air support furnace. The objective of a tempering process is always the same regardless of how the glass sheet is supported. Regardless of the glass sheet supporting practice, it does not eliminate the subsequently described end-edge kink problem, which is resolved by the invention.

The typical tempering temperature for a glass sheet of 4 mm thickness, i.e. the temperature, at which the glass proceeds from furnace to quenching unit, is 640° C. The glass tempering temperature can be lowered slightly as the glass thickness increases. The increase of tempering temperature enables the tempering of progressively thinner glass and reduces the cooling capacity required for quenching. On the other hand, merely increasing the tempering temperature from 640° C. to 670° C. establishes on the glass of 4 mm thickness a clearly higher strengthening or tempering degree, i.e. the compression stress at glass surface increases. For example, for a thin, 2 mm thick glass, the tempering temperature must be risen to at least 660° C. in order for tempering to succeed. Decreasing the thickness of the glass and rising the tempering temperature both increase the end-edge kink problem, which is resolved by the invention.

The glass arriving at a tempering process is excellent in terms of its straightness and optical properties. It has typically a glass surface compression stress of 1-4 MPa. It is an objective in the tempering process to provide the glass sheet with a sufficient increase of strength while compromising as little as possible its straightness and optical properties. In addition to strength, another desirable quality of tempered glass is safety in breaking. Nontempered glass breaks into large pieces with a laceration hazard. Tempered glass breaks into almost harmless crumbs.

The compression stress established in tempering at glass surface (degree of strength or tempering) is dependent on the temperature profile of glass in thickness direction as the glass is cooling through a transition temperature range (about 600→500° C.) typical for glass. Thinner glass requires more cooling capacity for obtaining the same aforesaid temperature difference. For example, the objective for a 4 mm thick glass sheet in tempering is the surface compression of about 100 MPa, whereby the center of glass thickness has a tensile stress of about 46 MPa. This type of glass sheet breaks into sort of crumbs that fulfill the requirements of safety glass standards. When tempering so-called FRG glass (fire resistant glass), an objective is a clearly higher surface compression stress. An objective with so-called heat strengthened glass is not to achieve safe breaking characteristics, nor a strength as high (surface compression of about 50 MPa is enough) as in tempered glass. Heat strengthening will be successful when the cooling capacity of air jets in a quenching unit is markedly reduced with respect to tempering. Other than that, as a process, heat strengthening is similar to tempering. The invention in question resolves the same problem in both. The aforesaid tempering temperatures are suitable as examples also in heat strengthening, i.e. tempering temperature refers, by the same token, also to heat strengthening temperature. The end-edge kink problem is not very dependent on whether for the glass is sought 50, 100 MPa or an even greater compressive surface tension, if the tempering temperature remains the same. In practice, in particular when tempering thin glasses less than 2.5 mm in thickness, the tempering temperature is raised as the target degree of tempering increases.

The formation of a downward-oriented end-edge kink starts as the end of the glass starts, due to gravity, to creep downwards during heating. The end creeps because the glass is heated in the furnace to a temperature of over 500° C., wherein the mechanical material properties of the glass start to change relatively sharply. At the same time, the glass starts to change from elastic to plastic. In this case, the mechanical rigidity of the glass drastically decreases, i.e. it deflects more easily. Creep rate is still slow in relation to the heating time at a temperature of 600° C. but, at a temperature of 650° C., it is already quite fast. The deformations of the glass reverse more weakly as plasticity increases. Kinking and creeping of the end of the glass would not occur if the glass were to be evenly supported inside the furnace. However, the glass support points (lines) in a roller hearth furnace are located only at the roller pitch intervals (typically 100-150 mm). In an air support furnace, an overpressured (in relation to the pressure in the airspace of the furnace) air bed supports the edges of the glass more weakly than the rest of the glass area, because the static overpressure of the air bed supporting the glass is lower on the edges of the glass. This is the case because, on the edges of the glass, the air of the air bed is able to exit both from the outlet openings below the glass in the air support table and also from between the glass and the planar surface of the air support table. A glass deflected at its ends in the furnace will not straighten by itself in the quenching, which solidifies the glass in a few seconds into its final elastic shape. Downward-oriented (towards the lower initial cooling air enclosures) end-edge kink typically starts approximately 50-200 mm from the ends of the glass, depending on i.a. the thickness of the glass, the roller pitch and the type of tempering machine. The length of the end-edge kink is the distance between its starting point and the end. In the glass of FIG. 1 (length 1095 mm), the leading end-edge kink starts at 80 mm (=end-edge kink length) distance from the leading edge of the glass, and is 0.415 mm in depth. The trailing end-edge kink starts at 70 mm distance from the trailing edge of the glass, and is 0.326 mm in depth. The most common starting point is at a distance of 50-150 mm from the end of the glass. In a tempered glass heated in a roller hearth furnace, the starting point of the leading end-edge kink is generally approximately at or below the distance between the support lines, i.e. the distance of the furnace roller pitch, from the end of the glass. Note that the above values are read from the shape data of the glass instead of according to the end-edge kink measurement manner of FIG. 3. The end-edge kink depth read was the vertical range between the end-edge kink starting point and the end, which does not entirely correspond to the end-edge kink of the measurement manner presented in FIG. 3. The correspondence is, however, exceptionally good.

Generally, as the end-edge kink is called the downwards deflected shape of the ends of a glass that results from aforesaid creep.

In some glasses coated on their top surface, there may also be an upwards deflected portion at the end of the downwards deflected end. Such an upwards deflected (towards the upper initial cooling air enclosures) end-edge kink is found in tempered (or heat-strengthened) glasses coated on their top surface with given types of coatings (for example, a pyrolytic low-emissivity coating). Its formation seems to be related to the heat expansion difference between the glass and the coating, i.e. in the furnace and/or in quenching, the coating attempts to expand or shrink to a different measure than the glass, as a result of which the ends of the tempered glass turn upwards, typically, for a distance of approximately 10-50 mm. In such a glass, end-edge kink starts generally first downwards (approximately at that point from which the aforesaid downward kink starts) and then turns upwards at the aforesaid distance from the end, as in the glass of FIG. 2. In the glass (length 1505 mm) of FIG. 2, the leading end-edge kink downwards starts at 130 mm distance from the leading edge of the glass, and turns into an upward kink at 35 mm distance from the leading edge. From this point, it rises upwards 0.115 mm. In the trailing edge, the corresponding values are 93, 28 and 0.04 mm. Further, in such a glass, in addition to the leading and trailing edges, also the sides of the glass are often upwards deflected starting approximately 10-50 mm from the side edge.

In FIGS. 1 and 2, the wave-like shapes of the glass on the inside of the ends are so-called roller waves, which are created in the glass in tempering furnaces provided with rollers (these are not created in an air support furnace).

The method according to the invention improves only the straightness of the ends of the glass, i.e. it does not affect the roller waves. The variation of the magnitudes of the coordinates of the wave crests of the shape data of FIG. 1 and the wave troughs of FIG. 2 is due to the unevenness of the support plane of the measuring apparatus.

FIG. 3 shows a manner according to standard EN12150-1 for measuring the end-edge kink of a glass. Therein, the top surface of the glass is the opposite surface in relation to the direction of the end-edge kink. The glass is placed onto the measuring plane such that its end extends slightly beyond the 50 mm of the plane. On top of the end of the glass is placed a straight ruler 300-400 mm long such that the dial gauge in the other end of the ruler is exactly at the end of the glass to be measured. The reading of the dial gauge is the end-edge kink of the glass, i.e. the depth of the end-edge kink. According to aforesaid standard, for example, the allowed end-edge kink of a 4 mm thick glass is 0.4 mm. In practice, the requirements of tempered glass producers regarding end-edge kink are somewhat more stringent than the standard. Even better quality values of glass are a competitive advantage for the tempering machine manufacturer and, further, for the tempered glass producer.

The end-edge kink problem increases as the thickness of the glass decreases, and is particularly great in glasses with thicknesses of 4 mm and thinner. In glasses more than 8 mm in thickness, the end-edge kink problem is minor. The length of the glass in the motion direction of the furnace does not appreciably affect the end-edge kink problem, but it is difficult to measure the end-edge kink according to aforesaid standard from glasses less than 300 mm in thickness. It can be stated that the invention is limited to glasses, whose length is greater than four times the length of a downward-oriented end-edge kink. For example, at a typical lower limit value for the length of aforesaid end-edge kink, a minimum length of the glass of 4×50 mm=200 mm is obtained.

The end-edge kink described above is a tempered glass quality problem generally known in the art. In practice, end-edge kink is problematic i.a. because it distorts the view reflected from the glass. Distortion, for example, in the reflection from the window of a building is an aesthetic disadvantage. Further, due to the end-edge kink, laminating the glass (two glasses are connected to each other by means of a lamination membrane between them) is more difficult, i.e. it requires special procedures and/or a thicker (more expensive) lamination membrane. Sealing the edges of the laminated glass is particularly important in order that the humidity of the outside air is not able to seep into it.

In practice, it has been observed that, by using the method according to the invention, end-edge kink values can be reduced. To decrease end-edge kink, it is essential that the initial blasting is directed onto the top surface of the end of the glass, when the assumed direction of the end-edge kink is downwards, i.e. towards the lower cooling air enclosures. Generally, it is then directed onto the top surface, because creep deflects the end of the glass downwards. In this case, due to the initial blasting, the top surface of the end of the glass cools, wherein it attempts to contract in relation to the bottom surface. The loose, plastic bottom surface is not capable of resisting the contracting effort of the top surface. Accordingly, initial blasting lifts the end of the glass upwards, i.e. the end-edge kink is straightened. Tempering cooling of both surfaces of the glass starting immediately after initial blasting solidifies the shape of the glass.

In the case of aforesaid pyrolytic low emissivity glass, initial blasting is initially directed onto the bottom surface, because the initial end-edge kink is upwards. After the upwards deflected portion (10-50 mm), initial blasting stops or switches onto the top surface, where it continues approximately up to the expected starting point of the downward kink.

As a generalization, initial blasting according to the invention is directed onto the surface of that side of the glass, to the direction of which normal it is desired to straighten the end. Initial blasting in the initial blasting zone is thus directed onto the top surface of the glass, when the expected direction of end-edge kink in the glass sheet is towards the lower initial cooling air enclosures, and initial blasting in the initial blasting zone is directed onto the bottom surface of the glass, when the expected direction of end-edge kink in the glass sheet is towards the upper initial cooling air enclosures.

From GB 1 071 555 is known a method and apparatus for producing a bent tempered glass sheet by conducting the bending through making use of unequal stresses generated intentionally in various areas and on opposite surfaces of the glass sheet. In an initial cooling section, just the top surfaces of the side edge portions of a glass sheet are subjected to cooling in order to produce a temporary upward curving of these areas, which are said to straighten as the whole glass is transferred into the cooling of both sides. The side edge portions are cooled in the initial cooling section along the entire length of the glass, and the intermediate portions not at all. Using the apparatus described in the publication it is not possible to direct initial cooling to the intermediate portion of the glass sheet, nor to direct it only to the leading and trailing edges of the glass. Accordingly, the purpose here is not to resolve the end-edge kink problem of a flat glass sheet, for which this patent application gives a solution.

In FI 20155730A, quenching of the side edge portions of the glass sheet is commenced a moment earlier than of the intermediate portions. The side edge portions are cooled at the beginning of quenching along the entire length of the glass, and the intermediate portions not at all. Accordingly, the publication does not resolve the end-edge kink problem of a flat glass sheet.

U.S. Pat. No. 3,923,488 presents a technique for decreasing the upward curl of the leading edge of a glass. Therein, onto the bottom surface of the glass outside of the leading edge is blasted initial cooling air before the actual quenching. Blowing starts 305-610 mm (1-2 feet) from the leading edge of the glass, and continues up to the trailing edge. Thus, the leading edge of the glass remains for 305-610 mm of its length without initial cooling of the bottom surface. The trailing end-edge kink problem of the glass is not disclosed at all, nor could the blasting described above even affect it, at least not at the same time with the leading edge problem. Accordingly, the publication does not resolve the downward kink problem of the end of the glass caused by creep, which occurs in both ends of the glass, and which is resolved by the method of claim 1.

U.S. Pat. No. 4,261,723 resolves the same problem as U.S. Pat. No. 3,923,488, but there is a clear difference in technique. In U.S. Pat. No. 4,261,723, only the top surface (i.e. exactly that part which is not initially cooled in U.S. Pat. No. 3,923,488) of the leading edge of the glass sheet is initially cooled after the furnace and before the quenching unit to straighten the upwards deflected portion of the leading edge of the glass sheet. The curl is thus in the opposite direction as in the problem resolved by the method of claim 1. Further, in terms of the direction of the end-edge curl, initial blasting is directed onto the opposite surface from what is essential to the method to be patented. Initial blasting is thus not directed onto the surface of that side of the glass, to the direction of which normal it is desired to straighten the end. Accordingly, the teaching of the publication is clearly in conflict with the method to be patented. A blasting direction according to the teaching of the publication would increase that end-edge kink problem, which the method to be patented decreases. In the publication, initial cooling is directed for a distance of the first 305 mm (1 foot) of the leading edge, nor is any need for a shorter blasting distance presented.

The trailing edge of the glass is not initially cooled at all, and the trailing end-edge kink problem is not disclosed at all. Accordingly, the publication does not resolve the downward kink problem of the end of the glass caused by creep, which occurs in both ends of the glass, and which is resolved by the method of claim 1. In the publication, the discharge of the initial cooling blasting is weaker on the side edge portions than on the intermediate portion of the glass, because the blast openings of the initial cooling air enclosure are larger at the intermediate portion of the glass and the blasting pressure is the same. As the width of the glass sheet changes, the initial cooling air enclosure would need to be exchanged in order that the widths of the side edge and intermediate portions of the glass sheet would remain the same in proportion to the width of the glass sheet, or if it were desired to entirely remove the blasting onto some portion of the glass sheet. The duration of initial blasting and the length of the initial blasting distance are the same along the entire width of the glass. By using the apparatus of the publication, it is not possible to initially cool a glass from its bottom surface.

In practice, an attempt has also been made to decrease aforesaid downward-oriented end-edge kink problem by attempting to use the lowest possible tempering temperatures and the tightest possible roller pitch in the roller hearth furnace and the quenching unit.

In the reference publication U.S. Pat. No. 6,410,887, an attempt is made to decrease the above-described upwards-oriented end-edge kink in a pyrolytically coated tempered glass by using in the furnace, at the beginning of heating, a more powerful upper than lower convection and the opposite at the end of the heating.

An objective of the invention is to provide a method, enabling thin (thickness not more than 9 mm, especially less than 5 mm) heat-strengthened and tempered glass sheets straighter in their leading and trailing edges. The objective of the invention is thus to improve the quality of glass by reducing its end-edge kink (for example, as measured according to standard EN12150-1).

This objective is attained with a method of the invention on the basis of the characterizing features presented in the appended claim 1. Preferred embodiments of the invention are presented in the dependent claims. In the claims, by tempering is meant generally a strengthening based on a significant heat treatment of the glass.

The invention will now be described more closely with reference to the accompanying drawings, in which FIG. 1 shows the measured shape of a glass, in which downward-oriented end-edge kinks are visible in both ends of the glass.

Figure 4:
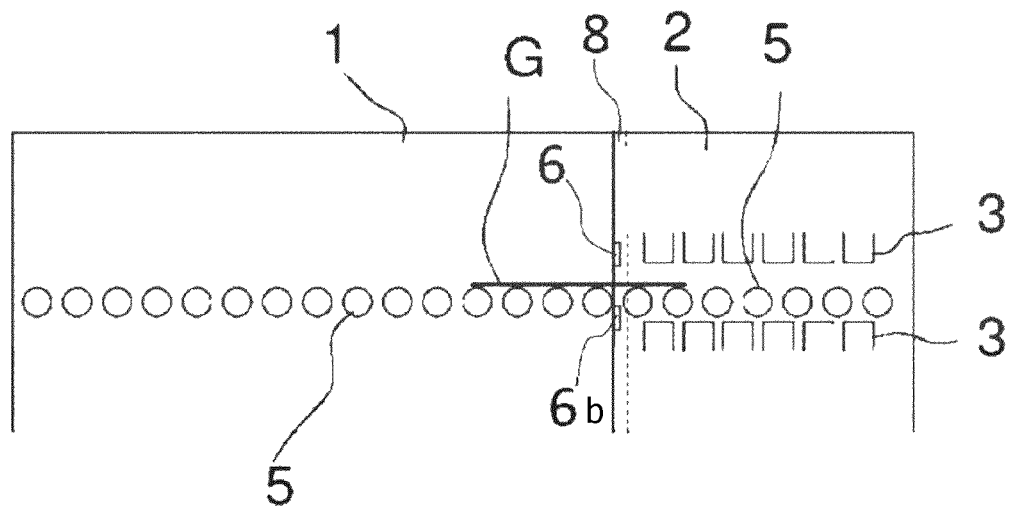
FIG. 4 shows the sections of the apparatus required in the method as viewed schematically from the side.

The apparatus comprises a furnace 1 and a quenching unit 2, which are successive in a glass sheet traveling direction in said sequence according to FIG. 4. The furnace 1 is provided with typically horizontal rollers 5 or an air support table along with its conveyor elements. These make up a conveyor track for the glass sheet. A glass sheet G to be heated is driven continuously in the furnace at a constant speed in one direction or back and forth for the duration of a heating cycle. Having been heated to a tempering temperature, the glass sheet proceeds from the furnace 1 to the quenching unit 2 at a transfer speed W, which is typically higher than the motion speed of glass in the furnace 1. Typically, the transfer speed is 200-800 mm/s.

Figure 1:
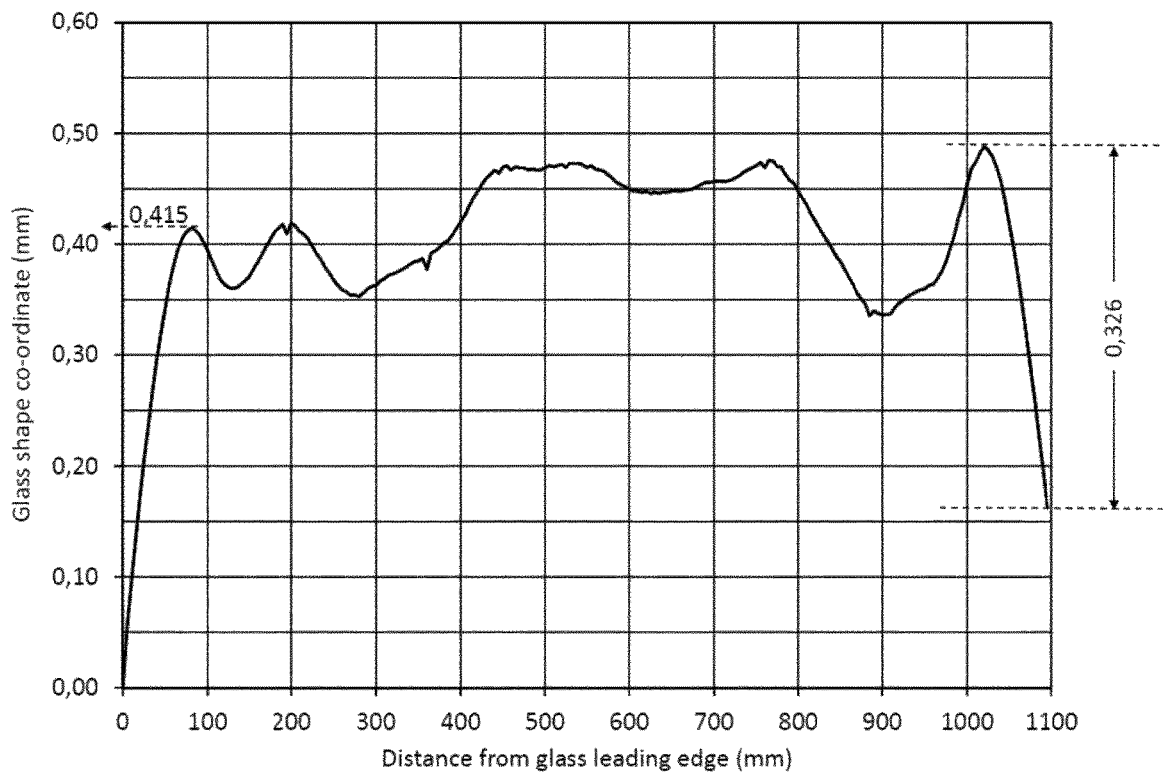
Figure 2:
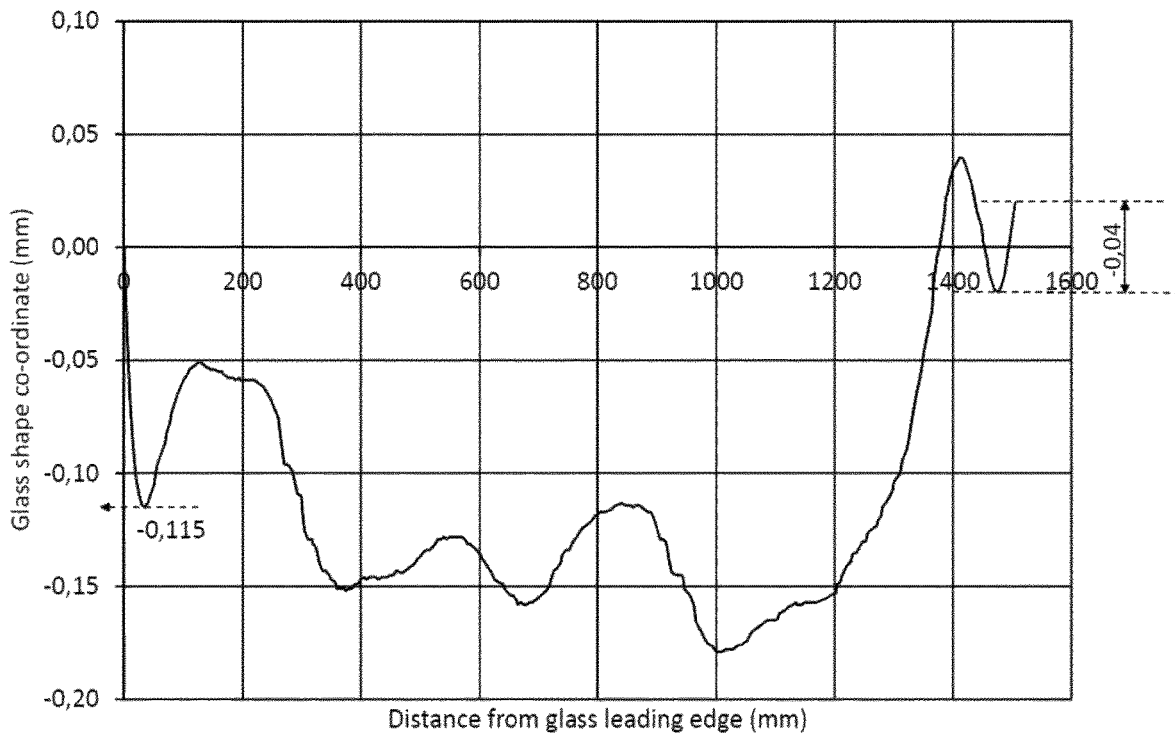
FIG. 2 shows the measured shape of a glass pyrolytically coated on its top surface.
Figure 3:
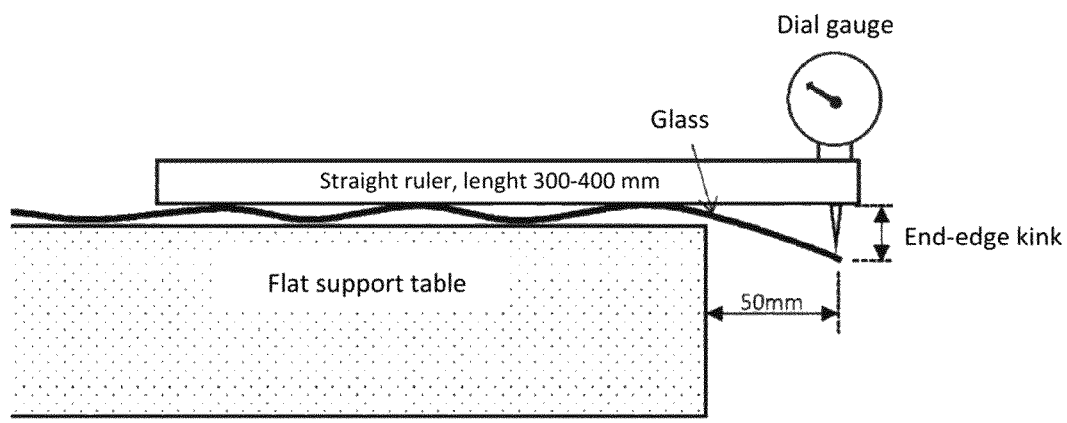
FIG. 3 shows the manner of measuring the end-edge kink of a glass according to the standard EN12150-1.

The quenching unit 2 is provided with typically horizontal rollers 5 and cooling air enclosures 3 above and below the rollers, as in FIG. 2. When the furnace 1 is an air support surface, the rollers 5 or the air support table, along with its conveyor elements, are in the quenching unit 2 typically in a slightly inclined position relative to a horizontal direction transverse to a motion direction of the glass G. The cooling air enclosures 3 are provided with blast openings 4, from which the cooling air discharges in jets towards the glass G. The blast openings 4 are typically circular holes and typically set successively in rows, as in FIG. 5. The blast openings 4 can also come in other shapes, for example, in slot shapes. For example, each part of a 3 mm thick glass is required to dwell in quenching at least for the period of about 3 seconds. At a transfer speed of 600 mm/s, for example, this would require a through-travel type quenching unit 2 with a length of not less than about 1800 mm. In a through-travel type quenching unit, glasses move in only one direction at a transfer speed W. A so-called oscillating quenching unit is generally approximately 1 m longer than the longest allowed length of a glass load. In this case, the glass load moves at a transfer speed W as a whole entity into the quenching unit, and turns back when the leading edge of the load reaches the end of the quenching unit. After this, the glass load moves back and forth in the quenching unit, until quenching and generally also the final cooling has ended.

In the beginning of the quenching unit 2, immediately after the furnace 1, there is an initial cooling unit 8, in which compressed air is blasted towards the top and/or bottom surface of the glass sheet. The apparatus 13 (in FIG. 6) compressing the air is, for example, a blaster or air compressor. In one preferred solution, the air used for initial cooling is compressed by an air compressor. The initial cooling unit 8 is composed in the lateral direction of the tempering line (=the horizontal direction transverse to the motion of the glass) of the initial cooling air enclosures (on the upper side 6 and on the lower side 6$b$) divided into the initial blasting zones (upper side 6.1-6.$i$ and lower side 6$b$.1-6$b$.$i$) on both sides of the glass sheet. The initial cooling air enclosures 6 and 6$b$ typically have round blast openings, and the arrangement of the blast openings is preferably similar (same disposition and diameter) in different zones. The width of one typical initial blasting zone is 20-250 mm, and the preferable width is 30-130 mm. The length of the blasting area of an initial cooling unit 8 in the motion direction of a glass sheet is most preferably the size of the diameter of one nozzle opening, i.e. it is composed of one nozzle opening row transverse to a motion of a glass. Preferably, the initial cooling unit 8 is formed from 1-3 successive rows of nozzle openings, and typically 1-6 rows of nozzle openings or a nozzle opening area, the length of which in the motion direction of the glass is between the diameter of one nozzle opening and 100 mm. Preferably, the aforesaid length is less than 50 mm. The distance between the nozzle openings in one nozzle opening row is typically less than 20 mm and preferably less than 10 mm. The distance between the blast opening and the surface of the glass (blasting distance) in the initial cooling unit is typically 5-70 mm, and preferably 10-40 mm. The air jets discharging from the nozzle openings of the initial cooling air enclosure strike the glass preferably perpendicularly, or at an oblique angle less than 10 degrees from it. The blast opening diameter in the initial cooling air enclosures 6 and 6$b$ is typically 0.5-3 mm, and preferably 0.8-2 mm. The blasting pressure in the initial cooling unit is typically 0.1-8 bar, and preferably 0.5-4 bar. The pressure can be regulated, for example, as the thickness of the glass changes. In a preferred solution, the zone-specific valves 7 are two-position, i.e. open/shut type. The initial blasting zones on the upper and lower sides have their own valves 7. The blasting pressure is regulated in the air channels by a pressure regulating valve 14 that is upstream of the branching dividing air into zones. Between the end of initial blasting and the start of quenching, blasting is a distance of preferably one roller interval, i.e. 8-14 cm. Typically, the aforesaid distance is 1-25 cm.

Figure 5:
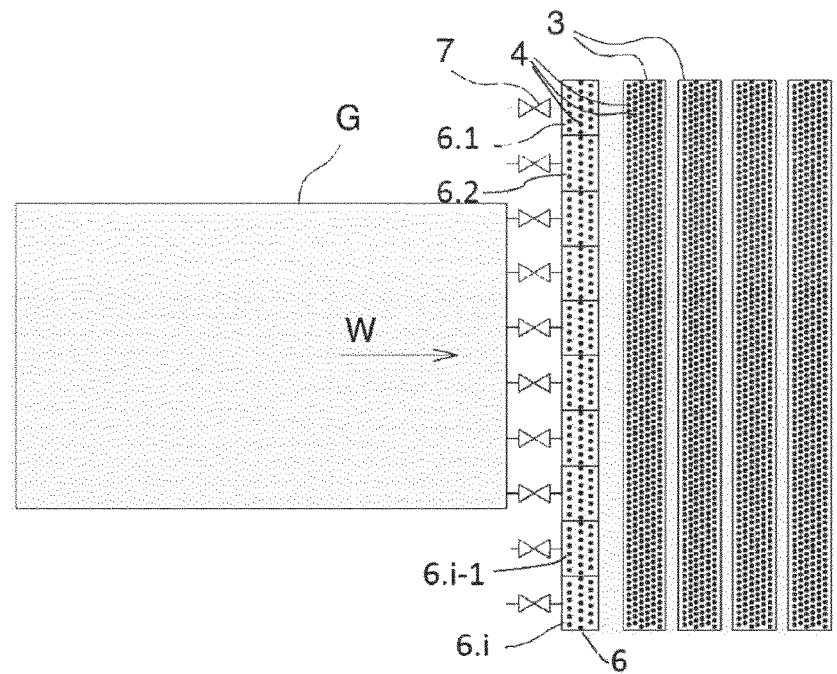
FIG. 5 shows schematically initial cooling air enclosures, along with blast openings thereof, for the apparatus required in the method as viewed from below the glass.

FIG. 5 shows a glass sheet proceeding into an initial cooling unit 8 according to the invention. There may be also several glasses side by side, they may be of various sizes, and their leading edges may arrive into the initial cooling unit at different times than in FIG. 8. The blasting onto a glass arriving into the initial cooling unit 8 starts as precisely as possible, exactly at the moment the leading edge of the glass arrives there.

Figure 7:
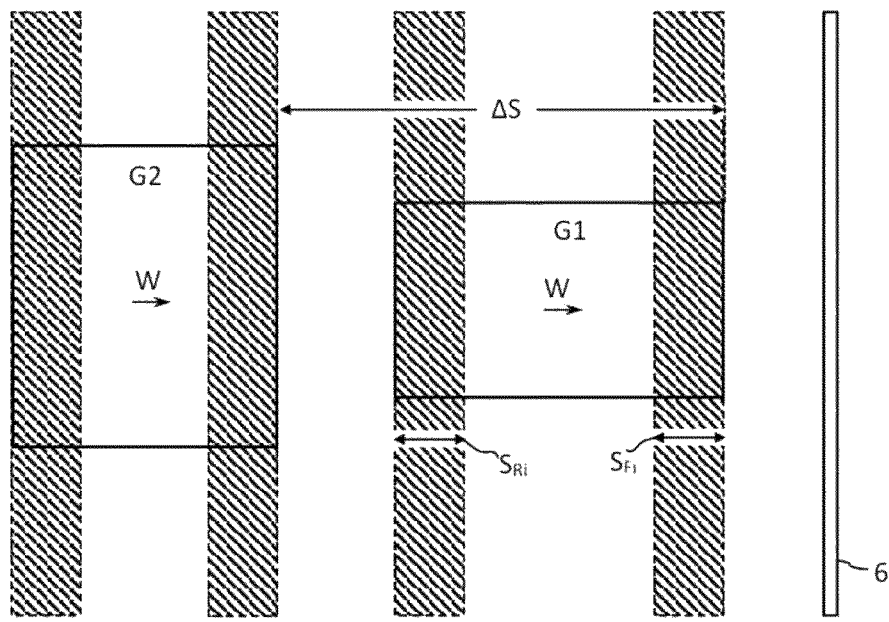
FIG. 7 shows the area of effect of initial blasting in two successive glasses according to the simplest implementation of the method.

In one embodiment of the method, blasting pressures and blasting times onto the leading and trailing edges of the glass are the same in all initial blasting zones 6.1-6.$i$ on the upper side of the initial cooler, and initial blasting into initial blasting zones 6$b$.1-6$b$.$i$ on the lower side is blocked by closing the zone-specific valves 7 on the lower side. In this case, if the (expected) length and/or depth of the end-edge kink is shorter in the trailing edge than in the leading edge of the glass, then shortening blasting time (i.e. shortening the blasting distance to the end of the glass) onto the trailing edge of a glass moving at a speed W prevents an excessively great effect of initial blasting onto the glass, which would straighten the trailing edge too much in the upwards direction. Such an embodiment of the method is successful without zone division of initial blasting, when the glasses arrive into initial blasting successively. FIG. 7 shows blasting patterns in this case. In FIG. 7, initial blasting onto the glass sheet G2, travelling thereinafter from its leading edge, starts a time $\Delta t = \Delta S/W$ later than onto the glass sheet G1, travelling further onward from its leading edge, wherein $\Delta S$ is the difference in distance parallel to the motion of the glass between the leading edges of the glasses G1 and G2, which ($\Delta S$) is greater than the length in the motion direction of the glass of the glass sheet G1, travelling further onward. The case of FIG. 7 is the simplest embodiment of the method. The simplest embodiment of the method is characterized in that, at the start of quenching, as initial blasting onto the surface of that side of the leading and trailing edges of the glass sheet, to the direction of which normal it is desired to straighten the end, air compressed to the initial blasting pressure is blasted on only one blasting zone covering the entire width of the glass. In this case, the initial blasting distance from the leading edge of the glass sheet towards the trailing edge of the glass sheet, ($S_{Fi} = Wt_{F1}$), is typically 10-250 mm and preferably 50-150 mm. Also, the initial blasting distance from the trailing edge of the glass sheet towards the leading edge of the glass sheet, ($S_{Ri} = Wt_{R1}$), is typically 10-250 mm and preferably 50-150 mm. The selected initial blasting distance and initial blasting pressure depend on the estimated end-edge kink in the glass sheet without initial blasting of the air and/or the end-edge kink measured from previous, substantially similar glass sheets. The initial blasting distance depends particularly on the estimated starting point (length) of the end-edge kink, and the initial blasting pressure on the estimated value (depth) of the end-edge kink.

Figure 6:
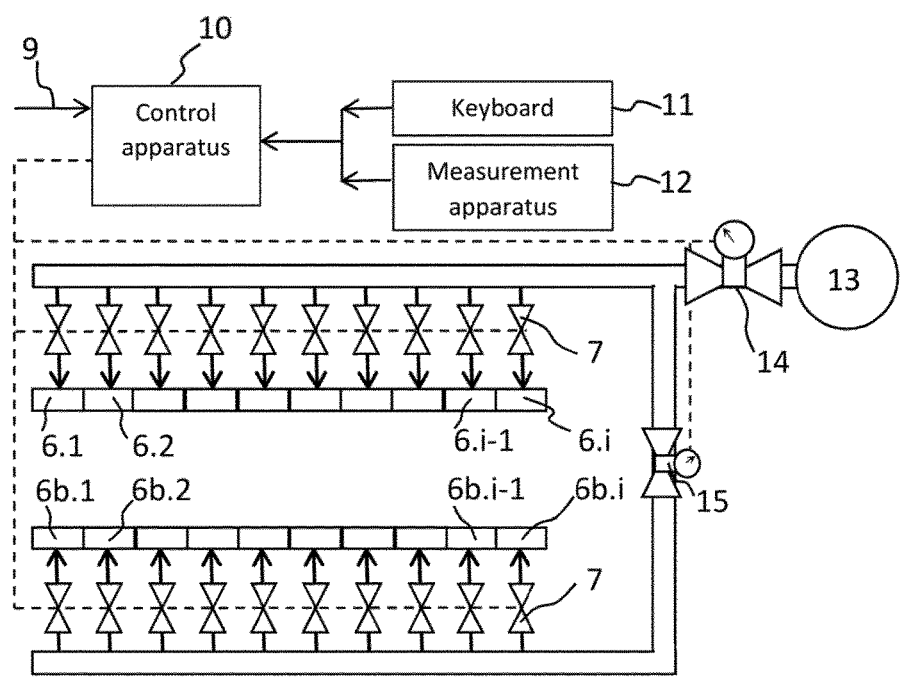
FIG. 6 shows schematically the apparatuses needed for the control of the initial blastings of the initial cooling zones.

The zone division of the initial blasting apparatus in FIG. 6 offers yet more preferred adjustment means, which are now described.

In a more sophisticated embodiment of the method, the blasting time in the initial blasting zones 6.1-6.i on the upper side of the initial cooling unit 8 within the width of the glass is dependent on the estimated local end-edge kinks in a glass sheet without initial blasting and/or the end-edge kinks measured from previous, substantially similar glass sheets. Blowing time thus varies between the initial blasting zones 6.1-6.i. If the estimated end-edge kink in the portion of a glass sheet in the area of effect of the initial blasting zone is deeper and/or longer, then the blasting time is greater. Typically, the blasting time, especially for a glass sheet heated in an air support furnace, in an initial blasting zone blasting onto the intermediate portion of the glass sheet, is shorter than in the initial blasting zone blasting onto the side edge of the glass sheet, because it is common that end-edge kinks are somewhat greater in the corners of a glass. It is also typical that end-edge kinks are greater in the leading edge than in the trailing edge of a glass sheet. Typically, blasting time is thus longer when blasting onto the leading edges than when blasting onto the trailing edges of a glass. There are also glasses, in which the trailing end-edge kink is greater than the leading end-edge kink.

Instead of or in addition to blasting time, also blasting pressure in the initial blasting zones 6.1-6.i on the upper side of the initial cooling unit 8 within the width of the glass can be dependent on estimated local end-edge kinks in the glass sheet without initial blasting and/or the end-edge kinks measured from previous, substantially similar glass sheets. In this case, blasting pressure increases especially as the depth of the end-edge kink, but occasionally also as its length, increases. An increase in blasting pressure increases the cooling effect of initial blasting, which increases the glass end straightening effect caused by initial blasting. Such an adjustment manner requires that the zone-specific valves 7 are pressure regulating valves instead of open/shut valves. Pressure regulating valves are not as functionally reliable as open/shut valves and, among these, there are valve-specific differences, even though regulating pressures should be the same in all of them. Also the timing of their (fully) open/shut adjustment is imprecise, which improves, when the valve 7 is composed of both pressure regulation and open/shut valves. Pressure regulating valves are also more expensive than open/shut valves.

The third manner of adjusting zone-specifically initial blasting that is different in its effect, is to blast onto the ends of the glass, in the zones on both the upper and lower side. In this case, all zone-specific valves 7 are open/shut valves. On the upper side, initial blasting pressure is the same in all initial blasting zones 6.1-6.i, but onto those portions of the end, which have a lower end-edge kink, is also blasted by the initial blasting zones 6b.1-6b.i on the lower side. The blasting time (blasting distance) on the lower side is shorter and/or blasting pressure less than on the upper side in order that the cooling effect of initial blasting and, further, its straightening effect on the glass is lower on the lower side. The initial blasting pressure on the lower side is set lower by means of an auxiliary valve 15. In this case, the initial blasting onto the lower side compensates a part of the effect of initial blasting onto the upper side, wherein the initial blasting effect of straightening the end of the glass upwards is lower.

In the foregoing, various manners of adjusting zone-specific initial blasting were described for straightening a normal downwards deflected end-edge kink. In the case of pyrolytically coated glass, the initial end-edge kink of the end of the glass is oriented upwards, wherein initial blasting (in the case of aforesaid third manner of adjustment, initial blasting more powerful in its cooling effect) is directed onto the bottom surface of the end of the glass instead of its top surface.

The initial blasting means on the lower side are only necessary in the case of the third manner of adjustment described above, and in the case of pyrolytically coated glass, when the initial end-edge kink of the end of the glass is oriented upwards. Accordingly, only the initial blasting means on the upper side are required for widespread utilization of a method according to the invention in the improvement of glass quality. The means on the lower side can be kept along with the means on the upper side to be sold as an optional accessory.

An initial blasting apparatus that is zone-specifically adjustable enables that also the ends of glasses travelling side-by-side can be blasted, even though the ends of the glasses arrive into the initial blasting area at different times.

Figure 8:
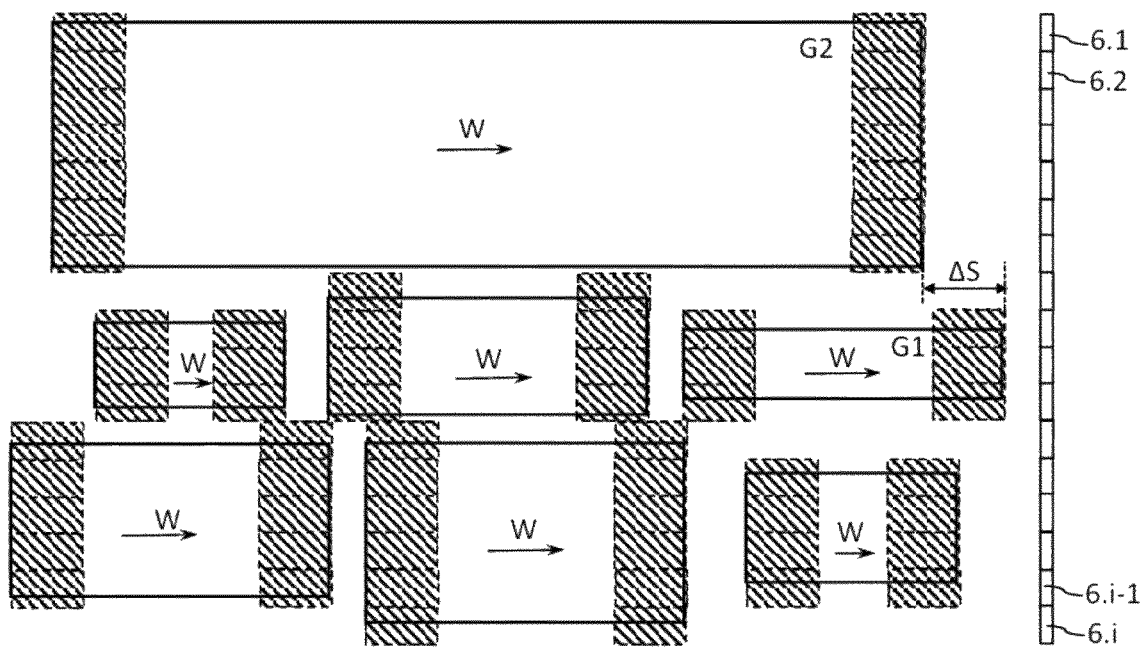
FIG. 8 shows the areas of effect in all the glasses of one glass load of initial blasting divided into zones.

The glass load of FIG. 8 includes several glasses and the size of the glasses varies. In FIG. 8, initial blasting is directed equally long onto the leading and trailing edge of each glass, i.e. initial blasting distances $S_{Fi}$ and $S_{Ri}$ are the same in each glass and in each zone i. However, zone division of the initial blasting apparatus is necessary, because the glasses of the glass load travel side-by-side and their leading and trailing edges arrive at different times under the initial blasting apparatus. In FIG. 8, the leading edges of the glass sheets G1 and G2 arrive into the initial blasting area at different times, and initial blasting onto the glass sheet G2, travelling thereinafter from its leading edge, starts a time $\Delta t = \Delta S/W$ later than onto the glass sheet G1, travelling further onward from its leading edge, wherein $\Delta S$ is the difference in distance parallel to the motion of the glass between the leading edges of glasses G1 and G2, which ($\Delta S$) is smaller than the length in the motion direction of the glass of the glass sheet G1, travelling further onward. Using an initial blasting apparatus the width of the entire blasting area, i.e. a zoneless apparatus, the initial blasting treatment of an entire glass load like that of FIG. 8 would not be possible. Unlike in FIG. 8, the blasting distances of the ends of the glasses of the glass load can vary zone-, glass- and end-specifically.

FIG. 6 shows schematically apparatuses relating to the control of the initial cooling unit 8. In the method, it is absolutely necessary that data regarding the location of the leading edges of the glass sheets is relayed to the control apparatus 10 in order that it opens the valves 7 in the initial blasting zones 6.1-6.i at the correct time. The valves 7 are closed after the blasting time required for completing the initial blasting travel distance. In the opening and closing of the valves 7, consideration is given to possible delays caused by the blasting piping between the valve control and the starting or stopping of blasting. The control apparatus 10 also needs data regarding the location of the trailing edges of the glass sheets in order that the initial blasting onto the trailing edge of the glass is targeted correctly. In addition is needed data, on the basis of which those portions parallel to the glass sheet's motion, in which a local end-edge kink previously estimated or measured from previous, substantially similar glass sheets is located, can be made, in the direction transverse to a motion of a glass, correctly positioned in relation to the initial blasting zones 6.1-6.i (and 6b.1-6b.i). Apparatuses for such a positioning of glass, i.e. for automatic defining and inputting into a control apparatus 10 of the size and location data of glass sheets, in tempering, are already generally known. To be sure, there are significant differences in the precision of various apparatus solutions. The arrow 9 in FIG. 6 shows the data required for positioning of the glass, which is produced by the automatic glass positioning apparatus. Data relating to the dimensions of the glass sheets can also be input into the control apparatus 10 manually with a keyboard 11. Such a manual solution is considered mostly only in production, where similar glass sheets are continuously being tempered (as long series), and one glass sheet at a time.

The suitable blasting lengths and blasting pressures to straighten the estimated end-edge kinks of the glass sheet are input manually into the control apparatus 10 with a keyboard 11. Their input is expedited, if the control apparatus 10 has at the ready a wide selection of various recipes for end blastings. The control apparatus 10 can also choose for itself from the selection the most suitable recipe for the size, type and thickness of the glass, or formulate it on the basis of the equations and glass dimension data that have been entered into it. In the method, it is preferred that the end-edge kinks of the tempered glass sheets are measured, for example, by an automatic end-edge kink measurement apparatus 12 disposed immediately after the quenching unit 2 or thereafter-located final cooling unit, which measurement apparatus inputs data into the control apparatus 10. The control apparatus 10 adjusts the valves 7 and the pressure regulating valve 14 on the basis of this measurement data. Accordingly, the zone-specific blasting times of the initial blasting zones are automatically adjusted on the basis of the measurement data of the end-edge kinks of the previous similar glass. The function of the measurement apparatus 12 is based, for example, on the change of direction in a laser beam reflecting from the glass or the distortion of a light pattern due to end-edge kink. There are apparatuses like the measurement apparatus 12 for rapidly measuring the end-edge kink of a glass sheet, but these are not yet used for an automatic real-time adjustment of the end-edge kink of a glass.

Directing air required for initial blasting onto both sides of a glass is achieved, for example, by two separate air feeder pipelines deviating from an apparatus 13 compressing air. The feeding of air can also be branched onto the different sides of the glass after the pressure regulating valve 14, for example, by an auxiliary valve, which directs air only onto the desired side of the glass.

Figure 9:
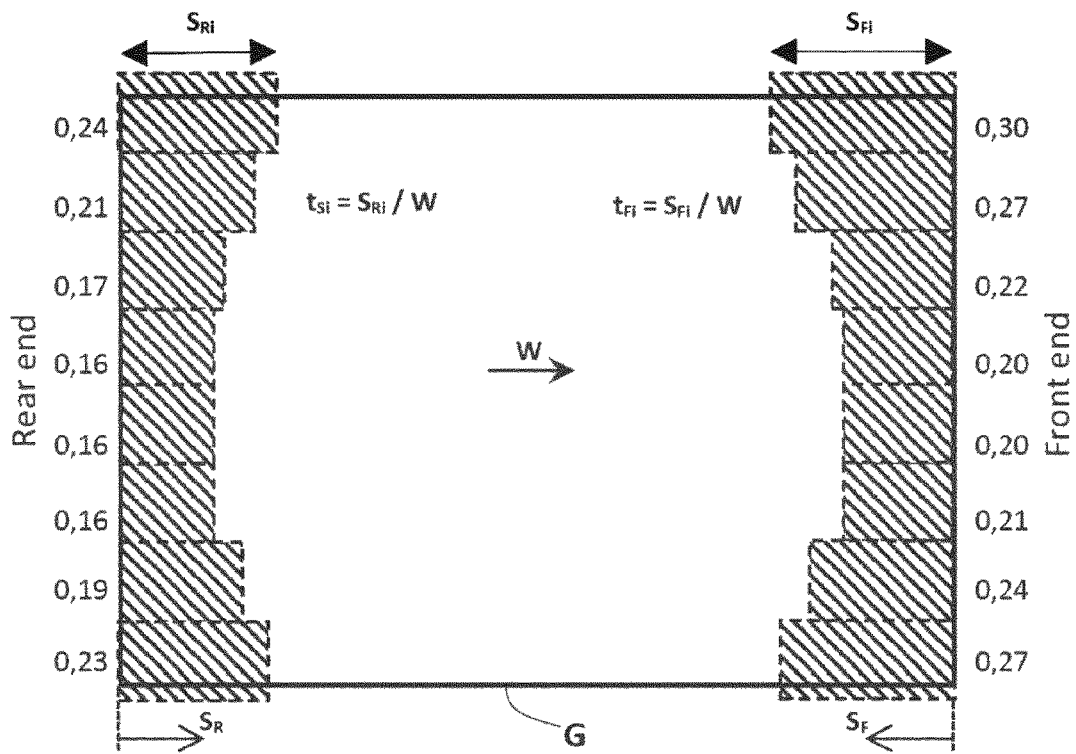
FIG. 9 shows end-edge kinks measured from the leading and trailing edges of a glass and the areas of effect of initial blasting for straightening the measured end-edge kinks in the glass, when zone-specific adjustment is performed using blasting time.

FIG. 9 shows an example of the measured local end-edge kinks of a glass (numbers in the ends of the glass sheet, unit is mm) and the relative blasting lengths for decreasing the local end-edge kinks measured in the glass. The direction of the end-edge kinks of the figure is downwards, i.e. towards the lower initial cooling air enclosures. The control system identifying the location of the leading and trailing edges of the glass, as well as the speed of the glasses, starts and stops initial blasting onto the leading edge zone of the glass such that it blasts onto the top surface of the glass for time $t_{Fi}=S_{Fi}/W$, which starts counting as the leading edge of the glass arrives under the jets of the initial cooling unit. In the foregoing, W is the transfer speed of the glass, and $S_{Fi}$ is the initial blasting distance entered into the control system, which is defined on the basis of experience-based data and/or the data the control system measured from the previous glass. In the trailing edge of the glass, the initial blasting zone blasts onto the glass for time $t_{Ri}=S_{Ri}/W$, which starts counting as the trailing edge of the glass approaches within range $S_{Ri}$ from the beginning of the blasting area of the initial cooling unit. The initial blasting zones of the initial cooling unit, located in the width without glass in the direction transverse to a motion of a glass load, do not blast at all. The initial blasting distance in the initial blasting zone up to the end of the glass is preferably, at its longest (towards the glass, which has the greatest end-edge kink), the previously estimated zone-specific length of the end fold, i.e. 50-150 mm. Typically, the initial blasting distance in the initial blasting zone up to the end of the glass is 0-250 mm, i.e. a zone of a glass can also remain entirely without initial blasting (as, for example, the intermediate portions of the glass of FIG. 11). Accordingly, at a aforesaid typical transfer speed (200-800 mm/s), the blasting time onto the end of the glass is 0-1.25 s. Blowing times, and further, initial blasting distances, are initial blasting zone-specific, and as they decrease, they decrease estimated end-edge kinks.

Figure 10:
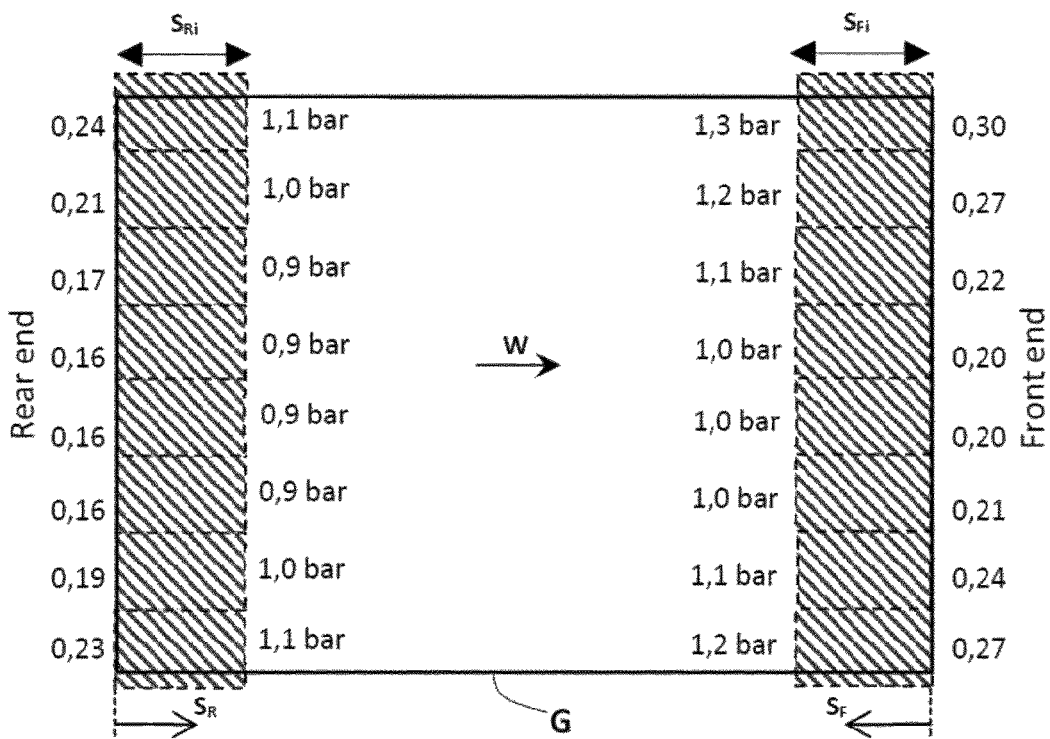
FIG. 10 shows end-edge kinks measured from the leading and trailing edges of a glass and the blasting pressures of initial blasting for straightening the end-edge kinks measured in the glass, when zone-specific adjustment is performed using blasting pressure.

FIG. 10 shows the same glass as in FIG. 9, but now zone-specific straightening of local end-edge kinks is performed by adjusting blasting time (blasting distance) instead of blasting pressures. In FIG. 10, the zone-specific initial blasting pressure entered into the control system is marked next to the zone. The selection of blasting pressure values is based on experience-based data and/or the data the control system measured from the previous glass.

Figure 11:
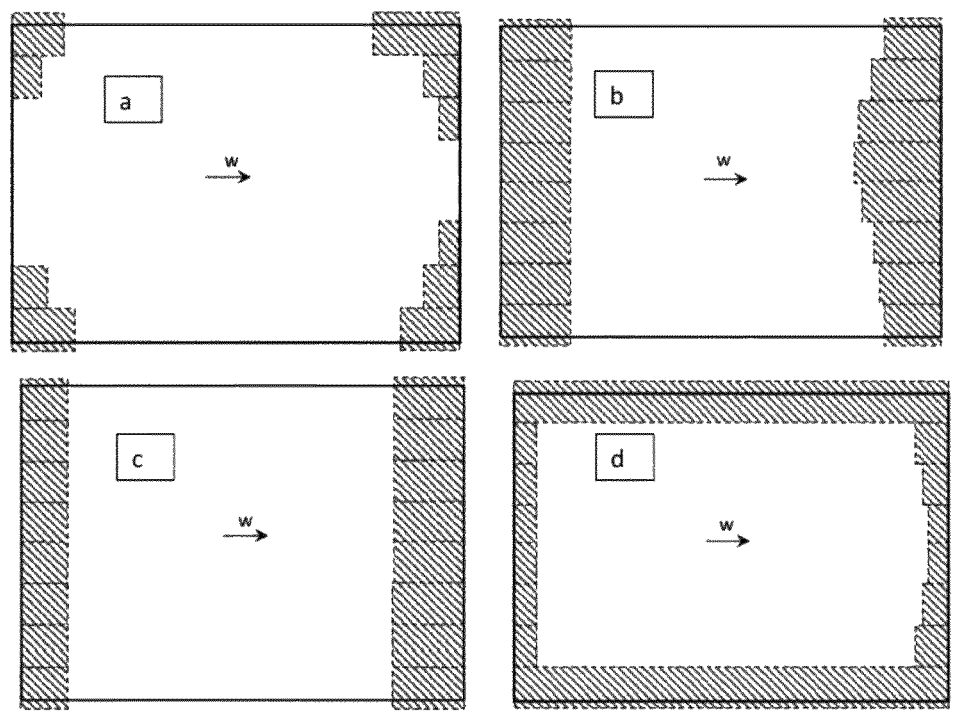
FIG. 11 shows examples (a-d) of areas of effect in the glass, possible for the method and caused by initial blasting, for straightening its end-edge kinks.

FIG. 11 shows as an example various blasting patterns, which can be formed to the glass sheet in the initial blasting zone. In blasting pattern a, initial blasting strikes only onto the corner areas of the glass, i.e. the ends of the intermediate portions of the glass are not initially cooled at all. In blasting pattern b, initial blasting distances in the trailing edge of the glass are constant and in the leading edge they are in the intermediate portions longer than in the edge portions. In blasting pattern c, initial blasting distances are constant in the leading and trailing edges of the glass, but in the leading edge they are longer. Such a blasting pattern can be formed to an individual glass, abreast of which there is no second glass, also without initial blasting zone division. Among the most common glass tempering line types, glasses to be tempered are in mixed loads, wherein blasting pattern c would not work for the glasses of the glass load without initial blasting zone division. Blowing pattern d covers, in addition to the ends, also the side edge portions of the glass. Such a blasting pattern is considered, for example, in the case of aforesaid coated glass quality. The blasting patterns a-d of FIG. 6 can be formed onto the top and/or bottom surfaces of a glass. Initial blasting in the initial blasting zone is directed onto the opposite surface of the glass in relation to the direction of the expected end-edge kink. I.e. for example, onto the top surface, when the direction of the expected end-edge kink in the glass sheet is downwards, i.e. towards the lower initial cooling air enclosures. The initial blasting patterns of FIG. 11 can be performed differently or similarly to each glass of the glass load of FIG. 8.

Next described will be yet unmentioned preferred or optional implementation practices of the invention, which, as appropriate, apply to all above-described embodiments.

Initial blasting onto the end of a glass does not need to be constant over the entire initial blasting distance ($S_{Fi}$, $S_{Ri}$), rather it can be suspended and resumed (pulsated). Preferably, initial blasting onto the edge portion of the glass sheet resumes earlier than to the intermediate portion of the glass sheet. Typically, initial blasting onto the intermediate portion is entirely stopped as the initial blasting distance is achieved, and, in this case, at least its intensity substantially weakens in order that to an area the length of the initial blasting distance in the end of the glass is directed a significantly stronger cooling effect than outside the area.

The cooling capacities (unit W/m2) needed for tempering fluctuate a great deal, depending on the thickness of and the tempering degree desired for a glass sheet. Therefore, the invention involves the examination of relative cooling capacities in various parts of the quenching unit. Thus, because the issue is not about absolute but, instead, relative cooling capacities, it is just as relevant to speak about cooling effects in various parts of the glass sheet. Accordingly, when speaking about cooling capacity, it is actually cooling efficiency and cooling effect that are meant at the same time. The heat transfer coefficient is obtained by dividing the cooling capacity with the temperature difference between glass and air. I.e. increasing blasting pressure and shortening the blasting range increase the heat transfer coefficient, which increases cooling effect. The blasting pressure of initial blasting depends relatively little on the thickness of the glass to be tempered, when transfer speed W decreases as thickness increases in the normal manner. Normally, the transfer speed of a glass, for example, 8 mm in thickness, is approximately 200 mm/s and for a glass 3 mm in thickness, approximately 500 mm/s. As transfer speed decreases, the time an end to be initially blasted dwells in initial blasting lengthens, which increases the cooling effect on the glass caused by initial blasting. Regarding the relationship between the heat transfer coefficients of initial blasting and actual quenching, the following can be stated. In the tempering of more than 5 mm thick glass, the average heat transfer coefficient caused by initial blasting onto the surface of the glass sheet in the striking area of the initial blasting jets is greater than after the initial blasting area in the actual quenching. The heat transfer coefficient of quenching increases as the glass thins, wherein the heat transfer coefficient relationship, tempering heat transfer coefficient/initial blasting heat transfer coefficient, increases.

In this disclosure, the length direction of a quenching unit or a glass sheet is a direction parallel to the glass sheet's motion. The start of a quenching unit is a part of the quenching unit, at which the glass is to arrive first. The lateral direction of a glass sheet or a quenching unit is a horizontal direction transverse to the glass sheet's motion direction. In the foregoing, the intermediate portion of a glass sheet refers to a central section co-directional with the motion of the end of the glass sheet, and the edge portion refers to a part of the side edge parallel to the motion of the glass sheet. The leading edge of the glass sheet refers to a limited length of area parallel to the glass sheet's motion starting from the leading edge of the glass. The trailing edge of the glass sheet refers to a limited length of area parallel to the glass sheet's motion starting from the trailing edge of the glass.

In the foregoing and in the claims are used i.e. the words initial blasting, initial blasting zone and initial blasting distance. The words are shortened versions of the words initial cooling blasting, initial cooling blasting zone and initial cooling blasting distance. Accordingly, by the shortened words is also meant a blasting cooling a glass.

In the claims, by end-edge kink is meant the deflection of the ends downwards, caused by creep and beginning 50-250 mm (generally 50-150 mm or 0.4-1.2 times the roller pitch of the furnace) from the leading or trailing edge of a glass, the creation of which is described in more detail in the description and which, according to the standard EN12150-1, is measured in the manner described in the description.

In the case of a glass coated on its top surface, in the claims, by end-edge kink is meant an upward deflection, due to the heat expansion differences of the coating (for example, a pyrolytic low-emissivity coating) and the glass, of the leading and trailing edges of the glass along an approximately 10-50 mm distance, the creation of which is described in more detail in the description.

The invention claimed is:

1. A method for heat strengthening or tempering glass sheets, in which one or more glass sheets are heated in a furnace to a tempering temperature and the one or more glass sheets are transferred at a transfer speed (W) away from the furnace into a quenching unit, in which quenching is conducted by blasting cooling air onto both surfaces of the one or more glass sheets, and in which by an initial blasting unit, located between the furnace and the quenching unit, is blasted compressed air as an initial blasting onto leading and trailing edges of the one or more glass sheets,
   wherein the initial blasting is directed onto the surface of a side of the one or more glass sheets so as to straighten the end and decrease downward-oriented end-edge kink, and
   wherein initial blasting distances from the leading edge of the one or more glass sheets towards the trailing edge of the one or more glass sheets, and from the trailing edge of the one or more glass sheets towards the leading edge of the one or more glass sheets, are 10-250 mm.

2. A method according to claim 1, wherein the initial blasting unit is divided into separately adjustable initial blasting zones in a direction transverse to a motion of a glass sheet of the one or more glass sheets, wherein a blasting time or a blasting pressure is adjusted separately.

3. A method according to claim 2, wherein the one or more glass sheets includes at least two side-by-side glass sheets, wherein leading edges of the at least two side-by-side glass sheets arrive into the initial blasting area at different times, and initial blasting onto a glass sheet of the at least two side-by-side glass sheets travelling thereinafter from its leading edge starts a time $\Delta t = \Delta S/W$ later than to a glass sheet of the at least two side-by-side glass sheets travelling further onward from its leading edge, wherein $\Delta S$ is a difference in distance parallel to the motion of glass between the leading edges of the at least two side-by-side glass sheets, which ($\Delta S$) is smaller than a length in a motion direction of glass of the glass sheet travelling further onward.

4. A method according to claim 2, wherein a width of one of the initial blasting zones is 30-130 mm.

5. A method according to claim 1, wherein, as initial blasting, onto a top surface of the leading and trailing edges of the one or more glass sheets is blasted compressed air in order to decrease downward-oriented, towards lower initial cooling air enclosures, end-edge kinks of the leading and trailing edges of the one or more glass sheets, and the initial blasting distances from the leading edges of the one or more glass sheets towards the trailing edges of the one or more glass sheets, and from the trailing edges of the one or more glass sheets towards the leading edges of the one or more glass sheets, are 50-250 mm.

6. A method according to claim 5, wherein the initial blasting distances from the leading edges of the one or more glass sheets towards the trailing edges of the one or more glass sheets, and from the trailing edges of the one or more glass sheets towards the leading edges of the one or more glass sheets, are 50-150 mm.

7. A method according to claim 1, wherein an initial blasting distance in the trailing edge of the one or more glass sheets is shorter than in the leading edge of the one or more glass sheets.

8. A method according to claim 1, wherein an initial blasting pressure in the trailing edge of the one or more glass sheets is lower than in the leading edge of the one or more glass sheets.

9. A method according to claim 1, wherein an initial blasting pressure increases as the end-edge kink deepens and the initial blasting distance lengthens as the end-edge kink lengthens.

10. A method according to claim 1, wherein onto a bottom surface of the trailing edge of the one or more glass sheets is blasted compressed air, a cooling effect caused by which on a bottom surface of the one or more glass sheets is lower and/or an initial blasting distance shorter than on a top surface of the one or more glass sheets.

11. A method according to claim 1, wherein, as initial blasting, onto a bottom surface of the leading and trailing edges of the one or more glass sheets coated on their top surface is blasted compressed air in order to decrease upwards-oriented, towards upper initial cooling air enclosures, end-edge kinks of the leading and trailing edges of the glass sheets, and the initial blasting distances from the leading edges of the one or more glass sheets towards the trailing edges of the one or more glass sheets, and from the trailing edges of the one or more glass sheets towards the leading edges of the one or more glass sheets, are 10-50 mm.

12. A method according to claim 11, wherein initial blasting onto a 10-50 mm wide zone of side edges of a glass sheet of the one or more glass sheets continues along an entire length of the glass sheet.

13. A method according to claim 1, wherein a duration of the initial blasting striking the leading and trailing edges of the one or more glass sheets is adjusted locally in a direction transverse to a motion of a glass sheet of the one or more glass sheets in at least three initial blasting zones such that the initial blasting distance from the leading edge of the one or more glass sheets towards the trailing edge of the one or more glass sheets, and/or the initial blasting distance from the trailing edge of the one or more glass sheets towards the leading edge of the one or more glass sheets, varies among the initial blasting zones.

14. A method according to claim 13, wherein the initial blasting distances are longer in initial blasting zones parallel to the motion of glass near side edges of the one or more glass sheets than in the initial blasting zones parallel to the motion of glass in a middle area of a width of the one or more glass sheets.

15. A method according to claim 13, wherein the duration of the initial blasting striking the one or more glass sheets is adjusted locally in the direction transverse to a motion of the glass sheet of the one or more glass sheets in at least five initial blasting zones.

16. A method according to claim 13, wherein a shape of the tempered ends of the glass sheet is measured by an automatic measurement apparatus in real time (online) to obtain measurement data, and zone-specific blasting times of the at least three initial blasting zones are adjusted automatically on the basis of the measurement data.

17. A method for heat strengthening or tempering glass sheets, in which one or more glass sheets are heated in a furnace to a tempering temperature and the one or more glass sheets are transferred at a transfer speed (W) away from the furnace into a quenching unit, in which quenching is conducted by blasting cooling air onto both surfaces of the one or more glass sheets, and in which by an initial blasting unit, located between the furnace and the quenching unit, is blasted compressed air as an initial blasting onto leading and trailing edges of the one or more glass sheets, wherein in order to decrease downward-orientated end-edge kink at the leading edge the initial blasting is directed onto a top surface of the one or more glass sheets, wherein initial blasting distances from the leading edge of the one or more glass sheets towards the trailing edge of the one or more glass sheets, are 10-250 mm, and wherein in order to decrease downward-orientated end-edge kink at the trailing edge the initial blasting is directed onto a top surface of the one or more glass sheets, wherein initial blasting distances from the trailing edge of the one or more glass sheets towards the leading edge of the one or more glass sheets, are 10-250 mm.

* * * * *